United States Patent [19]
Webster

[11] Patent Number: 4,784,115
[45] Date of Patent: Nov. 15, 1988

[54] ANTI-STUTTERING DEVICE AND METHOD

[76] Inventor: Ronald L. Webster, P.O. Box 9737, Hollins College, Roanoke, Va. 24020

[21] Appl. No.: 874,673

[22] Filed: Jun. 16, 1986

[51] Int. Cl.$^4$ ............................................. G09B 19/04
[52] U.S. Cl. ..................................... 600/24; 434/185
[58] Field of Search .................. 128/1 R; 434/185; 177/107 E

[56] References Cited

U.S. PATENT DOCUMENTS

| | | | |
|---|---|---|---|
| 3,349,179 | 10/1967 | Klein | 128/1 R |
| 3,358,390 | 12/1967 | Korn | 434/185 |
| 3,920,903 | 11/1975 | Beller | 434/185 X |
| 4,421,488 | 12/1983 | Parlenvi et al. | 434/185 |

FOREIGN PATENT DOCUMENTS

| | | | |
|---|---|---|---|
| 2260153 | 1/1974 | France | 434/185 |
| 214420 | 7/1941 | Switzerland | 434/185 |

*Primary Examiner*—Edward M. Coven
*Attorney, Agent, or Firm*—Rogers & Killeen

[57] ABSTRACT

An anti-stuttering device and method for enhancing the fluency of speech in stutterers. The device detects vocal pulses generated by the opening and closing of a speaker's vocal folds. Electrical signals representative of the vocal pulses are transmitted to a receiver in a sealed ear canal of the speaker where they are reproduced as audio pulses. The audio pulses produce a resonant effect within the ear canal to thereby provide an early indication of the characteristics of the speaker's voice and tend to reduce stuttering.

24 Claims, 1 Drawing Sheet

ANTI-STUTTERING DEVICE AND METHOD

BACKGROUND OF THE INVENTION

The present invention relates generally to a method and device for reducing stuttering and more particularly to an anti-stuttering device and method for transmitting voice related signals to the speaker's ear to provide speech therapy.

Children and adults who stutter have substantial difficulty in overcoming the handicap because of limitations in detecting relevant characteristics of their own speech. Normally in conventional methods for providing speech therapy for stutterers, the therapist must try to explain to the subject the various detailed characteristics of correct and incorrect movements which produce speech sounds. However, in reconstruction of speech behavior it is often difficult to cause the subject to attend to the details of his speech movements in a correct and efficient manner. Also, therapy sessions are frequent, can continue for months, and involve extensive efforts on the part of the therapist to be constantly attentive to the subject.

While the reasons for stuttering are not clearly known, it has been demonstrated that the handicap may be reduced or eliminated by the method of systematic reconstruction of the stutterer's speech behavior. However, because of the subject's difficulties in attending to the detailed characteristics of his speech, it remains difficult for the therapist to provide rapid and effective feedback to the subject concerning his responses.

To overcome these difficulties, methods and devices for providing speech therapy for stutterers such as disclosed in the Webster U.S. Pat. No. 4,020,567 dated May 3, 1977, have been developed which provide the subject with immediate feedback about the adequacy of his responses without constant attention on the part of the therapist. However, these methods and devices generally require a form of active monitoring by the therapist in a clinical environment, as well as the undivided attention of the subject.

Attempts to provide speech therapy methods and devices for use by stutterers in the absence of a therapist and outside the laboratory include those such as disclosed in the Klein U.S. Pat. No. 3,349,179 dated Oct. 24, 1967 which detect voice induced vibrations and provide a masking noise to prevent the speaker from hearing his own voice. However, the speaker's ability to hear other sounds while speaking is impaired by the masking noise, and the noise itself is a potential source of distraction and audible irritation to the speaker.

Other types of devices for use outside the laboratory include those such as disclosed in the Parlenvi, et al. U.S. Pat. No. 4,421,488 dated Dec. 20, 1983. Such devices amplify and transmit the speaker's voice and other detected sounds to miniature earphones inserted in the speaker's ear canals, with the signals being delayed to one ear in relation to the signal to the other ear to mitigate stammering. However, a major disadvantage of these systems, and likewise of systems such as disclosed in the aforementioned Klein patent, are the delays which result from the sensing of audio signals, i.e., the sounds of the subject's speech, rather than the earlier generated sounds of the subject's vocal pulses.

It is accordingly an object of the present invention to obviate the difficiencies of the known prior art and provide a novel anti-stuttering device and method for providing speech therapy.

It is another object of the present invention to provide a novel anti-stuttering device and method in which the sounds of the vocal pulses are detected to provide rapid transmission of auditory feedback to the ear canal of the speaker.

It is another object of the present invention to provide an anti-stuttering device and method for providing speech therapy which do not require the presence of a therapist.

It is a further object of the present invention to provide a novel method for providing speech therapy which utilizes the speaker's own vocal pulses to enhance fluency in speech.

It is yet another object of the present invention to provide a novel method for providing speech therapy in which voice related signals are transmitted to a receiver in a sealed ear canal of the speaker.

It is yet a further object of the present invention to provide a novel anti-stuttering device which in operation allows the speaker to hear his own voice with minimal noise distraction.

It is still another object of the present invention to provide a novel anti-stuttering device which rapidly transmits to the speaker's ear his voice related sounds in advance of either air, tissue or bone conducted sounds.

It is still a further object of the present invention to provide a novel anti-stuttering device which may be readily installed with resulting ease and convenience in use.

These and other objects and advantages will be readily apparent to one skilled in the art to which the invention pertains from a perusal of the claims and the following detailed description of the preferred embodiments which read in conjunction with the appended drawings.

THE DRAWINGS

FIG. 1 is a pictorial view of the present invention illustrated the installation of operative components relative to a sealed ear canal which is shown in cross section.

DETAILED DESCRIPTION OF THE PREFERRED EMBODIMENTS

Figure 1:
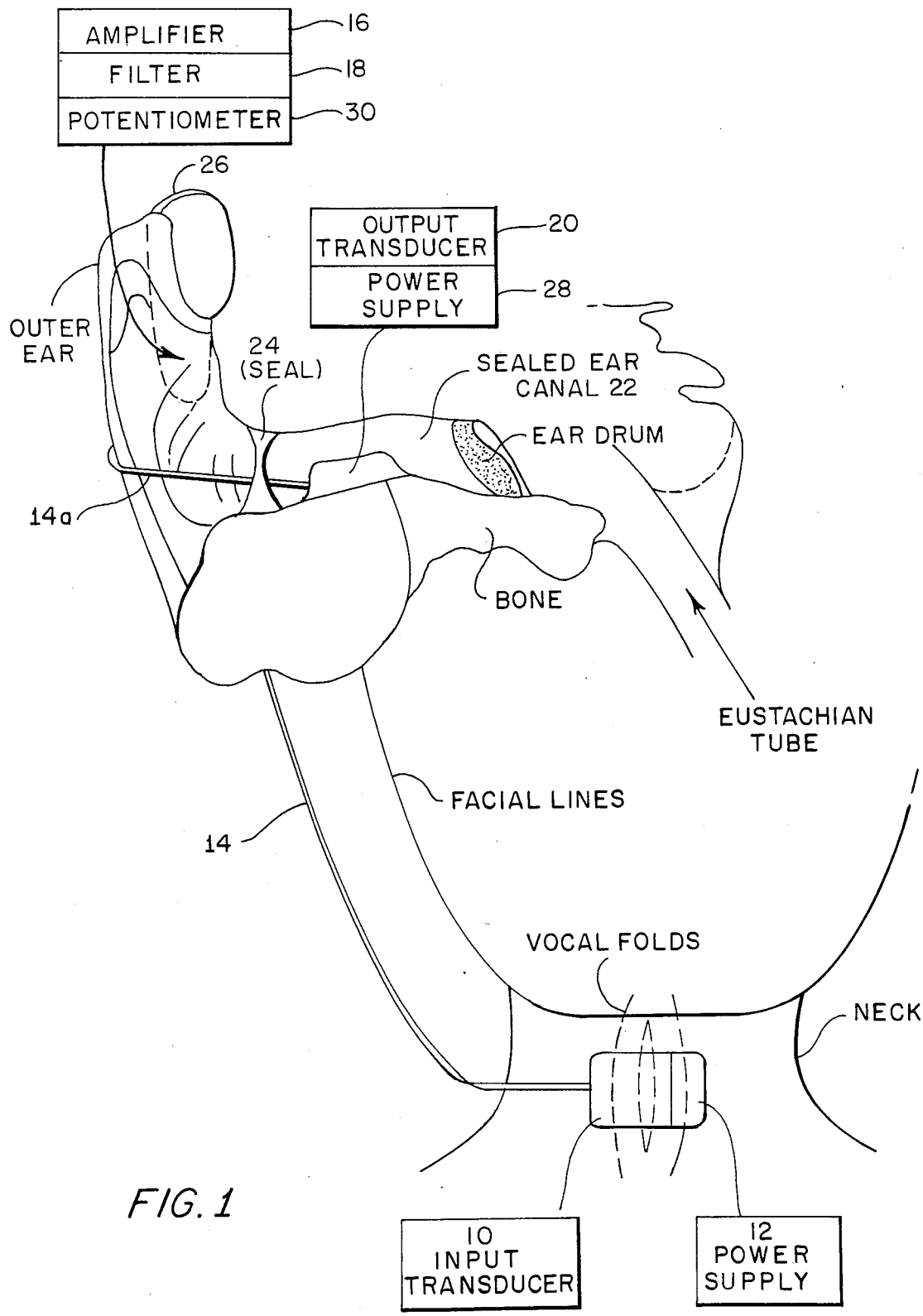

With reference to FIG. 1, an input transducer 10 may be mounted externally on a skin surface at or slightly below the level of the vocal folds to detect vocal pulses generated by the opening and closing of the vocal folds. The power supply 12 may be mounted with the transducer or in the small unit that mounts in the ear canal. Thus, a separate power supply for the transducer may not be needed.

The vocal pulses detected by the input transducer 10 are transformed into electrical signals which are transmitted via an electrical connection 14 to an amplifier 16 with filters 18 for attenuating high frequency components. Amplified and filtered signals are further transmitted via electrical connection 15 to a miniature output transducer 20 mounted in a sealed ear canal 22. These signals are then reproduced as audio-pulses which produce a resonant effect within the sealed ear canal 22. The sealed ear canal 22 may be sealed by means of sealed 24 positioned exteriorly of transducer 20, so that external sounds may be reduced while the speaker detects audio pulses on his ear drum.

The transducers 10 and 20, the amplifier 16, and filters 18 may be selected from any one of a number of conventional devices as may be the fitted ear canal seals 24. Also, a conventional ear mold case 26 may be custom molded for the speaker's ear with all or a portion of the amplifier 16- filter 18-output transducer 20 system being placed in the case 26. Alternatively, the system may be placed along with its power supply 28 in a compact enclosure which is completely within the sealed ear canal 22.

The device of the present invention, in operation, provides augmented feed back of vocal pulses to the sealed ear canal 22. With appropriate amplification of electrical signals, as discussed more fully below, the observed effect is to reduce or eliminate stuttering in speech. Muscle tension levels associated with stuttered speech are reduced, coordination of speech muscle activities is improved, and enhanced fluency occurs. Sustained use of the device may also lead to habitual use of coordinated speech muscle activity. Further, the device may function as a speech therapy device which improves vocal quality in selected persons who display vocal pathologies.

Preferably, the filters 18 are provided to attenuate frequencies of about 500 Hz in order to reduce the transmission of noise produced by clothing rubbing on the surface of the input transducer 10 as well as noise associated with breathing. Also, adjustment to the output of the amplifier 16 may be made by means of a miniature potentiometer 30 mounted on the case 28 in order to establish an optimum level of amplification. Typical gain levels through the operative components of the device are in a range of approximately 5–35 dB sound pressure level.

Advantageously, the amplification level may be set so that the speaker can hear his own voice, as well as other external sounds, in the unsealed ear with minimal distraction resulting from emission of reproduced vocal pulses in the sealed ear.

Although the operative components of the present invention may be electrically connected by means of wires, the wire leads may be replaced by a small FM microphone included with the input transducer 10 for detection of vocal pulses and transmission of electrical signals via the amplifier 16 and filters 18 to an FM receiver included with the output transducer 20. Elimination of connecting wires may materially enhance ease and convenience in use of the device.

Regardless of the manner of providing electrical connection of components, the device in operation tends to accelerate auditory feedback of vocal signals to the sealed ear when compared with the natural transmission of audio signals by way of air tissue and bone conducted feedback.

While the preferred embodiments of the present invention have been described, variations and modifications will naturally occur to those skilled in the art from a perusal hereof. It is therefore to be understood that the embodiments described are illustrative only and that the scope of the invention is to be defined solely by the appended claims when accorded a full range of equivalents.

What is claimed is:

1. A method of speech therapy comprising the steps of:
   (a) providing electrical signals related to the speaker's vocal pulses; and
   (b) transforming the electrical signals into audio pulses within the speaker's ear canal to thereby increase the speed with which the speaker is informed of a characteristic of his voice.

2. The method of claim 1 wherein the electrical signals are provided by the steps of:
   (a) providing a transducer capable of detecting and transforming the speaker's vocal pulses into electrical signals representative thereof when appropriately positioned externally of the skin of the speaker; and
   (b) placing the transducer on an external skin surface of the speaker in a position where detection of the speaker's vocal pulses may be effected.

3. The method of claim 2 wherein the electrical signals are filtered to remove frequency components above about 500 Hz thereby reducing both the sounds of contact between clothing and the transducer and the sounds associated with the intake of air by the speaker during respiration.

4. The method of claim 3 wherein the electrical signals are amplified sufficiently to provide audio-pulses of approximately 5–35 dB.

5. The method of claim 1 wherein the electrical signals are amplified sufficiently to provide audio-pulses of approximately 5–35 dB.

6. A method of speech therapy comprising the steps of:
   (a) providing electrical signals related to the speaker's vocal pulses; and
   (b) transforming the electrical signals into sounds within a sealed ear canal of the speaker to thereby produce a resonant effect within the ear of the speaker,
   thereby tending to reduce muscle tension levels associated with speech, improve coordination of speech muscle activities, and enhance fluency.

7. The method of claim 6 wherein the electrical signals are provided by the steps of:
   (a) providing a transducer capable of detecting and transforming the speaker's vocal pulses into electrical signals representative thereof when appropriately positioned externally of the skin of the speaker; and
   (b) placing the transducer on an external skin surface of the speaker in a position where the detection of the speaker's vocal pulses may be effected.

8. The method of claim 7 wherein the electrical signals are filtered to remove frequency components above about 500 Hz thereby reducing both the sounds of contact between clothing and the transducer and the sounds associated with the intake of air by the speaker during respiration.

9. The method of claim 8 wherein the electrical signals are amplified sufficiently to provide audio pulses of approximately 5–35 dB.

10. The method of claim 6 wherein the electrical signals are amplified sufficiently to provide audio-pulses of approximately 5–35 dB.

11. An anti-stuttering device comprising:
    means for providing electrical signals related to a speaker's vocal pulses, and
    means for providing audio-pulses related to said signals in the speaker's ear canal, to thereby increase the speed with which the speaker is informed of a characteristic of his voice.

12. The device of claim 11 wherein said signal providing means comprises:

means for detecting vocal pulses; and means for amplifying said signals sufficiently to provide audio-pulses in a range of 5–35 dB.

13. The device of claim 12 including means for adjusting the level of amplification provided by said amplifying means.

14. The device of claim 13 including means for filtering said signals to remove frequency components above about 500 Hz.

15. The device of claim 12 including means for filtering said signals to remove frequency components above about 500 Hz.

16. The device of claim 11 wherein said signal providing means includes an FM transmitter and an FM receiver.

17. The device of claim 11 including a container adapted for insertion into the ear canal, and wherein said audio pulse providing means is disposed interiorly of said container and includes a power source therefor.

18. An anti-stuttering device comprising the means for:

(a) providing electrical signals related to the speaker's vocal pulses; and (b) transforming the electrical signals into sounds within a sealed ear canal of the speaker to thereby produce a resonant effect within the ear of the speaker, thereby tending to reduce muscle tension levels associated with speech, improve coordination of speech muscle activities, and enhance fluency.

19. The device of claim 18 wherein said electrical signal providing means includes transducer means capable of detecting and transforming the speaker's vocal pulses into electrical signals representative thereof appropriately positioned externally of the skin of the speaker.

20. The device of claim 19 also comprising means for filtering said electrical signals to remove frequency components above about 500 Hz thereby reducing both the sounds of contact between clothing and said transducer means and the sounds associated with the intake of air by the speaker during respiration.

21. The device of claim 20 also comprising means for amplifying said electrical signals sufficiently to provide audio-pulses of approximately 5–35 dB.

22. The device of claim 18 also comprising means for amplifying the electrical signals sufficiently to provide audio-pulses of approximately 5–35 dB.

23. In a speech therapy device for stutterers and certain other individuals displaying vocal pathologies having means for transmitting the speaker's vocal pulses to an ear canal of the speaker, the improvement comprising means for sealing the ear canal whereby said sounds provide a resonant effect within the ear canal.

24. The device of claim 23 wherein said sealing means includes a first seal blocking the entry of sound external to the ear canal.

* * * * *